Aug. 4, 1970  C. BRENOT  3,522,737

GAS-BEARING GYROSCOPES INCLUDING A ROTARY BEARING MEMBER

Filed Jan. 25, 1968  5 Sheets-Sheet 1

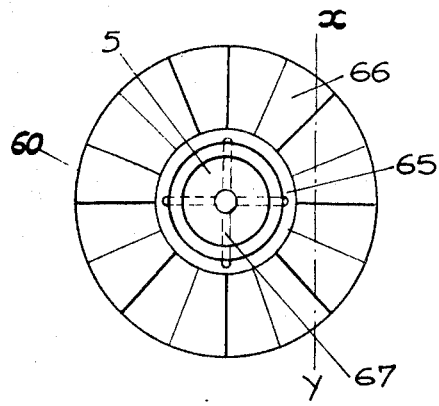
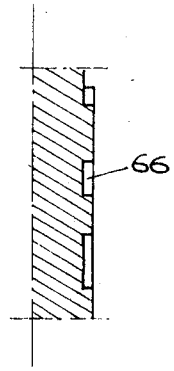
Fig. 8a    Fig. 8b
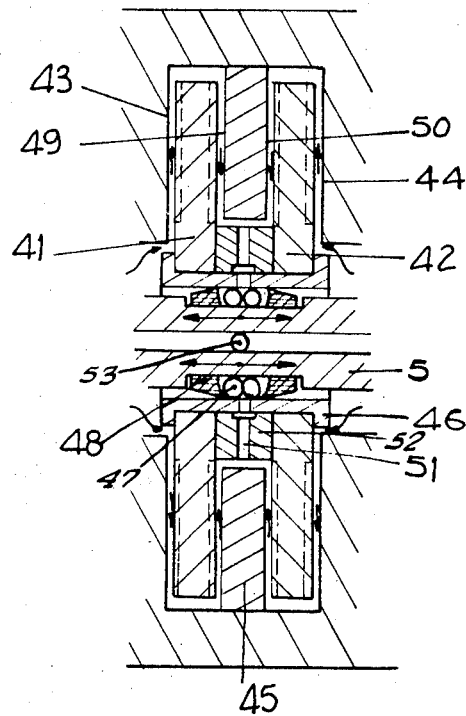
Fig. 9

United States Patent Office 3,522,737
Patented Aug. 4, 1970

3,522,737
GAS-BEARING GYROSCOPES INCLUDING A ROTARY BEARING MEMBER
Claude Brenot, Paris, France, assignor to CSF-Compagnie Generale de Telegraphie Sans Fil, a corporation of France
Filed Jan. 25, 1968, Ser. No. 700,468
Claims priority, application France, Feb. 2, 1967, 93,495
Int. Cl. G01c *19/20*
U.S. Cl. 74—5.7         7 Claims

ABSTRACT OF THE DISCLOSURE

In a gyroscope with a gas bearing system including a rotary support driven by a shaft rotated by a motor inside the gyroscope gas-tight casing, the necessary pressurized gas is produced in a closed cycle from the gas present in the gyroscope casing, with the help of a movable member driven by said shaft. Preferably, this movable member comprises one or more discs provided with spiral grooves for compressing the gas by a viscosity effect.

---

The present invention relates to gas-bearing gyroscopes wherein the bearing gas layer is supported by a rotary bearing member.

As is well known such bearings have the advantage that the irregularities of the bearing member which may affect the operation of the assembly are, so to say, averaged due to the fact that the bearing member constantly rotates. However rotary bearing systems cannot support the gyroscope rotor in a purely hydrodynamic manner and require the use of a gas compressor system.

Up to the present the compressors used to this effect were entirely independent of the gyroscope itself and were located outside of the gyroscope structure. This resulted in many drawbacks and inconveniences: a rotary joint, an auxiliary motor and connecting ducts were necessary.

It is an object of this invention to avoid such drawbacks by incorporating the compressor into the gyroscope envelope and by using for driving the compressor the energy which is available on the gyroscope shaft.

According to the present invention, there is provided a gyroscope comprising a vacuum tight casing containing gas and, inside said casing: a spindle journaled for rotation in said casing; a bearing member mounted on said spindle for rotation therewith; a rotor having a hollow portion containing said bearing member with the interposition of a gap forming a gas bearing for said rotor; a movable part mounted on said spindle for rotation therewith in a space portion of said casing communicating with said gap; and connecting ducts, including an axial duct through said spindle, for injecting gas compressed by means of said movable part into said gap through said spindle and said bearing member.

For a better understanding of the invention and to show how the same may be carried into effect reference will be made to the drawings accompanying the following description and in which:

FIG. 3a shows a disc which is a part of the compressor;

FIG. 3b is a diammetral section of the disc of FIG. 3a;

FIGS. 8a and 8b show respectively a plan view and a sectional view of a detail of FIG. 7; and FIG. 9 is a schematic section of a modification of the air compressor.

Figure 1:
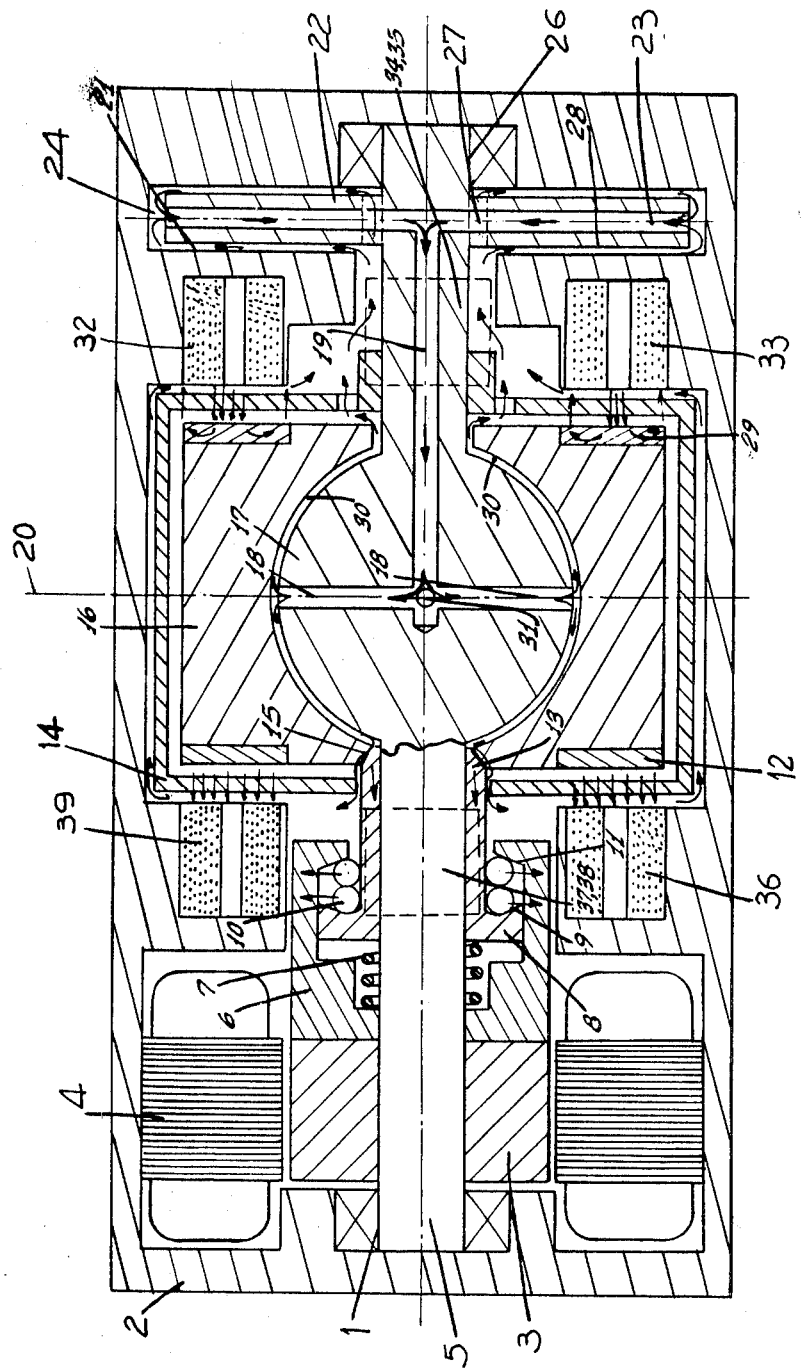
FIG. 1 illustrates a schematic axial section through one embodiment of the gyroscope according to the invention, the section being along a horizontal plane passing through the axis of revolution of the rotary bearing member.

In the embodiment shown in FIG. 1, a spindle 5, integral with a sphere 17 is mounted on bearings 1 and 26 in a gas tight casing 2. The bearings 1 and 26 may be of any conventional type. The spindle 5 is rotated by a motor 4 of any known kind, for example of the electrical hysteresis type, whose magnet 3 is made solid with the said spindle.

The rotor 16 is in the form of a cylinder, the axis of which coincides with the axis of the driving spindle 5. It is recessed internally to match a sphere 17 which is located within it and from which it is separated by a gas film 30 a few microns thick, this film being maintained by the supply of compressed gas through an axial passage 19 and radial passages 18, the latter being provided in desired number, and two being shown by way of example in FIG. 1.

The gas used in the gas bearing can be air, an inert gas, or, preferably, helium or hydrogen.

The rotor 16 is placed inside a casing 14 which is made integral with the spindle 5 and prevents any parasitic couples which might otherwise arise due to aerodynamic effects and serves also as a heat shield.

The centering and the blocking in the nonoperative state of the rotor 16, are effected by means of a locking brake, whose housing 6 is made integral with the spindle 5. A sleeve 8, is slidably mounted on the spindle 5, but is prevented from rotating relative to it. It is terminated in a taper 13 which bears against a corresponding taper 15 formed on the rotor 16, under the action of a spring 7. Two sets of balls 10 are placed in a staggered fashion between two tapered walls 9 and 11 formed respectively on a vertical terminal projection of the housing 6 and on a flange carried by the sleeve 8.

The rotor 16 carries on its bases respective rings 29 and 12 of magnetic material, which move as the rotor rotates, past two groups of four solenoids 32 to 35 and 36 to 39.

Figure 2:
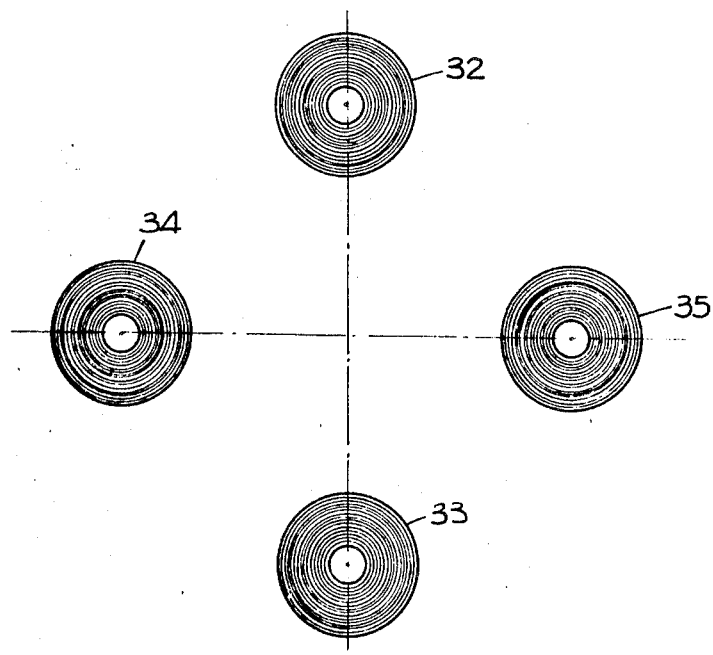
FIG. 2 shows diagrammatically the arrangement of the coils used for detecting the angular movements of the rotor of the gyroscope of FIG. 1.

FIG. 2 illustrates the arrangement of the coils of each group of solenoids in a plane perpendicular to the axis 5.

The spindle 5 drives a compressor built up by a disc 22 running in a recess formed in the casing 2. On the faces 28 of the disc 22, spiral grooves are formed. The disc is as close as possible to the walls 21 and 25 of the recess in which it is located. Passages 23 extending through the disc, connect the passages 19 to the gas bearing. That face of the ring 22 opposite the wall 21 receives the air to be compressed directly from the casing 14 and the face which is opposite the wall 25 receives the air through the holes 27, formed in the disc, these holes also serving to balance the disc 22.

With the gyroscope at rest, the tapered sleeve 8 locks the rotor 16. When the motor 4 is started, the spindle 5 starts to rotate and carries the rotor 16 along with it. As the speed builds up, the compressor drives more and more compressed air into the gap 30.

Figures 3A, 3B:
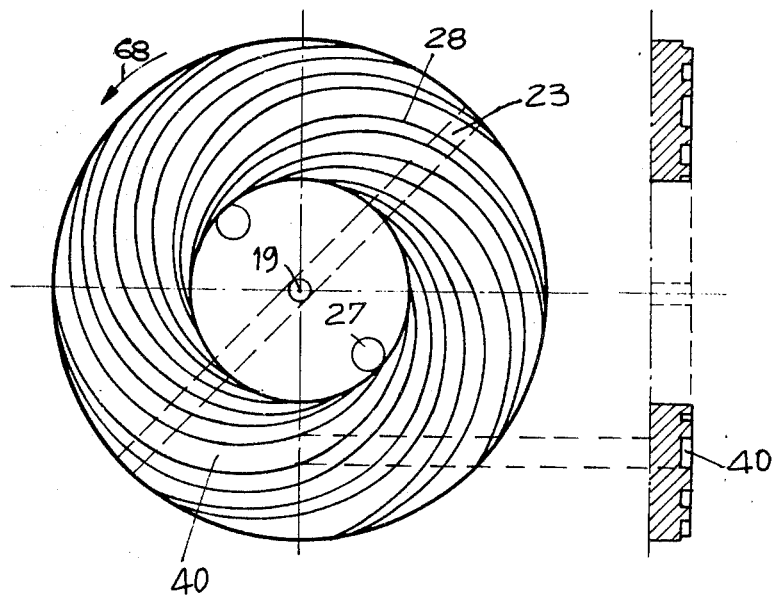

The operation of the compressor will be better understood, from a consideration of FIG. 3a, which shows a lateral view of the disc 22 and wherein the same references are used as in FIG. 1. The spiral grooves 40, which are some few microns deep, are more readily seen in the diametral section of the disc 22 shown in FIG. 3b. Due to viscosity effect, with the disc rotating in the direction indicated by the arrow 68, the gas trapped between the grooves 40 and the walls 21 and 25 moves from the centre of the disc towards the periphery 24 of the recess wherein the disc rotates.

Once the spindle 5 has substantially reached its normal speed, the centrifugal force then developed is sufficient to force outwards the balls 10 located in their tapered races. The sliding sleeve 8 then moves away from the rotor 16 which is freed, and is supported by solely by the gas bearing and goes on rotating synchronously with the spindle 5, except for a slight slippage which may be disregarded.

The bearing arrangement considered allows the rotor 16 two degrees of freedom, one about the axis 20, perpendicular to the axis of the spindle 5 in the plane of FIG. 1, the other about the axis 31 which is perpendicular to the axis 20 at the centre of symmetry of the sphere 17. The radial support for the rotor is achieved by a hydrodynamic effect. This is explained in FIG. 4, which shows a section through the rotor 16 and the spherical bearing member 17, in a plane perpendicular to the axis of the spindle 5 and containing the centre 56 of the sphere 17, the centre of the rotor being at the point 57.

The gap 30 is in the shape of a crescent. The gas is caused to rotate due to the viscosity effect between the walls 16 and 17.

Successive positions of a volume of gas which is driven into rotation by the simultaneous motion of the rotor 16 and the bearing member 17, as indicated by the arrows 69, are indicated by 54 and 55. This volume of gas is progressively compressed, so that its pressure rises and it acts somewhat as a wedge, as is usual in hydrodynamic bearings, creating the force indicated by the arrow 17.

The axial supporting of the rotor 16 is achieved by a hydrostatic effect. This is explained in FIG. 5, which shows a section identical to that of FIG. 1, but with the rotor 16 offset in relation to the sphere 17 parallel to the axis 5.

The escape paths offered leftwards and rightwards to the gas coming from the passages 18 have different respective sections 58 and 59. The flow from the left-hand portion of the gap is lower than the flow from the right-hand portion of the gap.

This results in a higher gas pressure at the left-hand side of the duct 18 than at the right-hand side thereof which has the effect of restoring the proper centering of the rotor.

Figure 6:
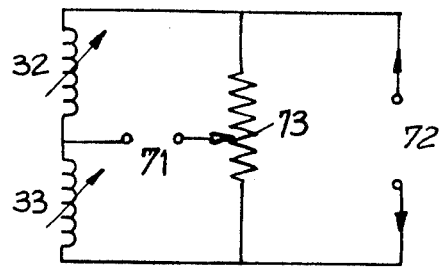
FIG. 6 is a diagram of the electrical circuit of the coils of FIG. 2.

The solenoids 32 to 35 and the magnetic ring 29 are employed to measure the angular displacements of the rotor 16 about the axes 20 and 31. FIG. 6 illustrates a conventional bridge circuit arrangement of the two opposite coils 32 and 33. An alternating voltage is applied to the terminals 72. The resultant voltage at the terminal 71 is zero if the rotor 16 is precisely centered and if the bridge has been balanced by means of the potentiometer 73. If the rotor 16 becomes eccentric, the ring 29 (FIG. 1), moving for example closer to the coil 32 than to the coil 33, this gives rise to a modification in the relative reluctance of the two solenoids, so that at 71 a voltage appears whose amplitude is proportional to the eccentricity.

The coils 34 and 35 have a similar function, in relation to an axis which is perpendicular to that with which the coils 32 and 33 are concerned.

Similar coils 35, 36, 37, 38, placed opposite those already mentioned and in front of the magnetic ring 12, enable a precessional couple to be exerted with great accuracy on the rotor; these coils are fed with a train of identical electrical pulses, the repetition frequency of which controls the rate of precession of the rotor. For this purpose, it is necessary to make the pulse train frequency dependent upon the speed of rotation of the rotor.

Figure 5:
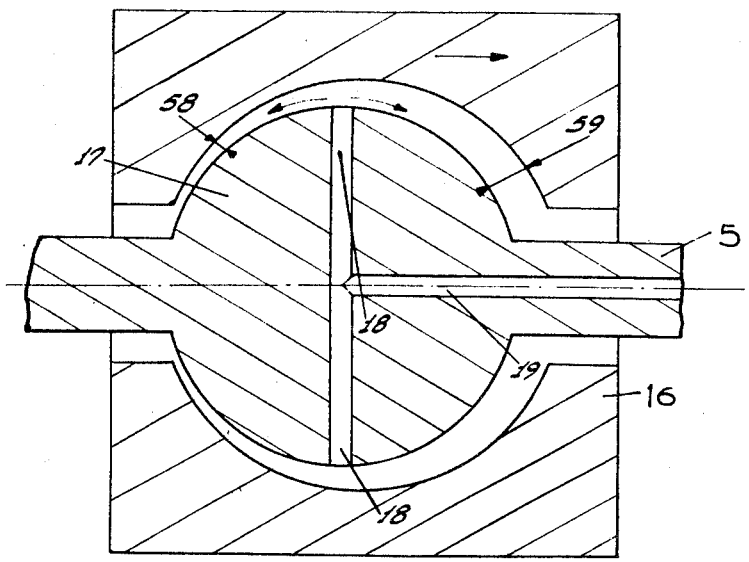
Figure 7:
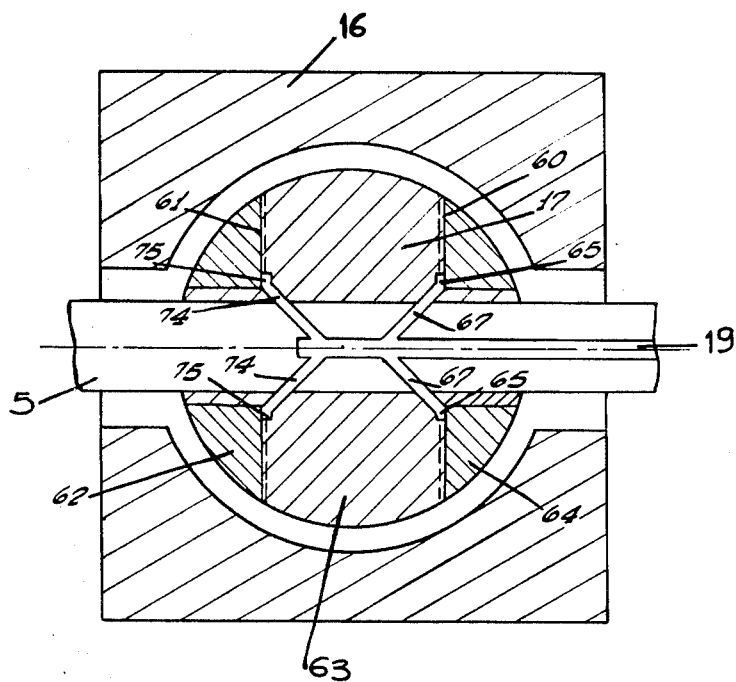
FIG. 7 is a sectional view of a modification of the system injecting the compressed gas into the gap.

A modification of the axial supporting arrangement for the rotor 16, is shown in FIG. 7, the view being a sectional one, similar to that of FIG. 5. The air supply to the bearing is effected in a different fashion. The air supply passage 19 communicates with small passages 67 which open into an annular chamber 65 around the spindle 5. The chamber 65 supplies passages extending from the chamber 65 to the periphery of the sphere 17, along a small circle 60 in a plane perpendicular to the axis of the spindle 5. The passage 19, in an identical manner, supplies similar passages radially disposed in a small circle 61, symmetrically located to the circle 60 relatively to the centre of the sphere 17, through passages 74 which open into an annular chamber 75.

The sphere 17 is made in three past 62, 63, 64.

FIG. 8a is a lateral view of the circle 60, with radial grooves 66, some few microns deep. A corresponding sectional view is shown in FIG. 8b, the plane of section being the plane xy. The circular portion 61 of part 62 is identical to circular portion 60.

Figure 4:
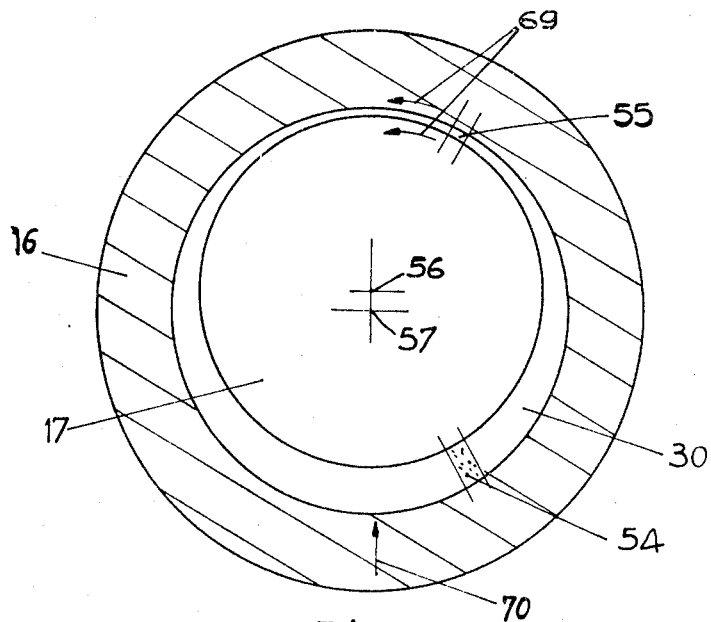
FIGS. 4 and 5 show diagrammatically a section through the rotor and its support arrangements, respectively along a plane perpendicular to the drive axis and a plane passing through the drive axis and the air inlet passages.

Such an arrangement does not in any way affect the axial stability obtained by the hydrostatic effect demonstrated in FIG. 5, but adds to the hydrodynamic effect described with reference to FIG. 4, in so far as radial rigidity is concerned, a hydrostatic effect which stabilises the hydrodynamic action due to the gas flow through the grooves 66.

These grooves build up feed passages in which a pressure loss is produced similar to that obtained by the injection diaphragms of conventional hydrostatic bearings. In this manner, the assembly behaves as a hydrostatic bearing in both directions.

A modified air compressor is illustrated in FIG. 9, where the drive spindle 5 carries two discs 41 and 42, which rotate between fixed walls 43 and 44 on one side and the two walls 49 and 50 of an intermediate member 45 on the other side. The discs are joined with a spacer 52.

These discs are mounted on the spindle 5 by means of a hub 46 which is keyed to the spindle by means of balls 47 so that the arrangement can move in the axial direction. Packings 48 make the assembly tight. The discs are provided on their faces with spiral grooves similar to those of FIG. 3. However, such grooves may be formed in the walls or, both in the walls and in the discs.

The gas enters the duct 19 formed in the spindle 5 after passing through the ducts 51 and 53 formed in the spacer 52, and in the spindle 5 itself. The direction of the grooves and the direction of rotation of the discs is such that compression is in the centrifugal direction along the walls 43 and 44, and in the centripetal direction along the walls 49 and 50. Due to their axial mobility, the rings are automatically centered by the effect of the pressure exerted against their faces. It will be noted of course that this latter arrangement can also be employed with a single disc.

It is quite clear from the foregoing that this floating rotor gyroscope with gas bearings presents the advantage that only a small air flow is required, something which is compatible with a particularly simple compressor design, low in weight and capable of being readily incorporated into the gyroscope unit, the degree of wear being extremely low and the necessary maintenance being reduced. In addition, the provision of an automatic locking device ensures rapid starting and avoids any deterioration of the gas bearing when the gyroscope is not in operation or during starting and stopping.

The performance of this gyroscope is such that it can be used for inertial navigation. In one such embodiment it had the form of a cylinder having a 45 mm. diameter and 75 mm. long.

Of course the invention is not limited to the embodiments described and shown which were given solely by way of example.

What is claimed is:

1. A gyroscope comprising a vacuum tight casing containing gas and, inside said casing: a motor provided with a spindle journaled for rotation in said casing; a bearing member mounted on said spindle for rotation therewith; a rotor having a hollow portion containing said bearing member with the interposition of a gap forming a gas bearing for said rotor; a gas compressor comprising a movable part mounted on said spindle for rotation therewith, an inlet for receiving gas and an outlet for delivering the received gas at a higher pressure, said inlet communicating with said gap through at least one path wholly external to said bearing member and to said spindle; and a system of ducts for injecting into said gap the gas compressed by said gas compressor, said system including an axial duct through said spindle, said axial duct communicating with said outlet, and ducts in said bearing member, connecting said axial duct with said gap.

2. A gyroscope as claimed in claim 1, wherein said movable part comprises $n$ discs centered on said spindle, $n$ being a positive integer; each disc having a first and a second face, at least the more peripheral portions of which are located in a cylindrical recess of said casing having a first face and a second face, and respectively associated with said first and second faces of the disc locates therein; two associated faces being parallel, separated only by a thin gas interstice, and grooves being provided in at least one of the faces of each pair of associated faces.

3. A gyroscope as claimed in claim 2, wherein $n=1$, and wherein the two faces of the single disc are provided with grooves ensuring a centrifugal flow of the gas on the two faces thereof, when said spindle rotates in a predetermined direction; said single disc being further provided with radial ducts, connecting said recess to said axial duct, and with apertures perforating it from one face to the other.

4. A gyroscope as claimed in claim 2, wherein $n=2$, the two discs being parts of a solid unit, mounted on said spindle, and the two cylindrical recesses having a common wall, the two faces of which are said second faces of said two recesses; said solid unit having radial ducts connecting said two recesses with said axial duct; said first faces of said two discs having grooves ensuring a centrifugal flow of the gas when said spindle rotates in a predetermined direction, and said second faces of said two discs having grooves ensuring a centripetal flow of said gas when said spindle rotates in said predetermined direction.

5. A gyroscope as claimed in claim 4, wherein said solid unit is mounted on said spindle by means of a ball device allowing the possibility of a small axial displacement of said unit relatively to said spindle.

6. A gyroscope as claimed in claim 1, comprising a centrifugal effect device integral with said spindle for locking said rotor to said spindle when the rotation speed of said spindle is under a predetermined value.

7. A gyroscope as claimed in claim 1, wherein said rotor has the shape of cylinder of revolution whose axis, at rest, coincides with that of said spindle, said cylinder having two bases each of which is provided with a ring of magnetic material; two groups of four coils, whose position is fixed within said casing, being associated with each of said rings so that the axes of the four coils of each group cut the median circle of the associated ring at the apices of a square inscribed in said median circle when said rotor is at rest; said gyroscope further comprising a system, including the four coils of one group, for measuring the position of the axis of said rotor, and a control system, including the four coils of the other group, for imparting a precession motion to said axis of said rotor.

References Cited

UNITED STATES PATENTS

| | | | |
|---|---|---|---|
| 2,688,805 | 9/1954 | Annen | 74—5.7 XR |
| 2,809,527 | 10/1957 | Annen | 74—5.7 |
| 2,729,106 | 1/1956 | Mathiesen | 74—5 XR |
| 3,194,613 | 7/1965 | Pierry et al. | 308—9 |
| 3,257,854 | 6/1966 | Schneider et al. | 74—5.7 |
| 3,283,594 | 11/1966 | Parker et al. | 74—5 XR |
| 3,365,958 | 1/1968 | Bard et al. | 74—5 |

FOREIGN PATENTS

| | | |
|---|---|---|
| 1,425,837 | 12/1965 | France. |

FRED C. MATTERN, Jr., Primary Examiner

A. ANTONAKAS, Assistant Examiner

U.S. Cl. X.R.

74—5